(12) United States Patent
Farha

(10) Patent No.: US 9,230,070 B2
(45) Date of Patent: Jan. 5, 2016

(54) SYSTEM FOR PROVIDING MULTIPLE LEVELS OF AUTHENTICATION BEFORE DELIVERING PRIVATE CONTENT TO CLIENT DEVICES

(71) Applicant: CHIPP'D LTD., New York, NY (US)

(72) Inventor: Omar Farha, New York, NY (US)

(73) Assignee: CHIPP'D LTD., New York, NY (US)

( * ) Notice: Subject to any disclaimer, the term of this patent is extended or adjusted under 35 U.S.C. 154(b) by 0 days.

(21) Appl. No.: 14/418,891

(22) PCT Filed: Aug. 12, 2013

(86) PCT No.: PCT/US2013/054581
§ 371 (c)(1),
(2) Date: Jan. 30, 2015

(87) PCT Pub. No.: WO2014/026199
PCT Pub. Date: Feb. 13, 2014

(65) Prior Publication Data
US 2015/0213238 A1    Jul. 30, 2015

Related U.S. Application Data

(60) Provisional application No. 61/681,962, filed on Aug. 10, 2012.

(51) Int. Cl.
H04L 29/06    (2006.01)
G06F 21/12    (2013.01)
G06F 21/10    (2013.01)
G06F 21/34    (2013.01)

(52) U.S. Cl.
CPC .............. *G06F 21/128* (2013.01); *G06F 21/10* (2013.01); *G06F 21/34* (2013.01); *H04L 63/0407* (2013.01); *H04L 63/101* (2013.01); *H04L 63/102* (2013.01); *G06F 2221/0791* (2013.01); *G06F 2221/2113* (2013.01); *H04L 2463/101* (2013.01)

(58) Field of Classification Search
None
See application file for complete search history.

(56) References Cited

U.S. PATENT DOCUMENTS

| | | | |
|---|---|---|---|
| 2005/0044179 A1* | 2/2005 | Hunter | G06F 17/30879 709/218 |
| 2007/0198414 A1 | 8/2007 | Derrenberger | |
| 2008/0209522 A1 | 8/2008 | Ephraim et al. | |
| 2011/0165836 A1 | 7/2011 | Dixon et al. | |
| 2012/0150742 A1 | 6/2012 | Poon et al. | |
| 2013/0159396 A1 | 6/2013 | Newman | |

FOREIGN PATENT DOCUMENTS

KR    10-2009-0038078 A    4/2009

* cited by examiner

*Primary Examiner* — David Pearson
(74) *Attorney, Agent, or Firm* — IM IP Law PLLC; C. Andrew Im

(57) ABSTRACT

A system for providing multiple levels of authentication before delivering private content to the client devices over the communications network. A product identifier on the physical product is scanned using a code reader/decoder in the client device to access or request private content from the server. The server receives the device identifier associated with the client device and the product identifier associated with the physical product from the client device over the communications network for authentication. The server processor transmits the requested content, preferably a webpage, to the client device if both the device identifier and the product identifier are authenticated by the server processor.

18 Claims, 5 Drawing Sheets

SYSTEM FOR PROVIDING MULTIPLE LEVELS OF AUTHENTICATION BEFORE DELIVERING PRIVATE CONTENT TO CLIENT DEVICES

RELATED APPLICATIONS

This application is a §371 application from PCT/US2013/054581 filed Aug. 12, 2013, which claims benefit of U.S. Provisional Application No. 61/681,962 filed Aug. 10, 2012, each of which is herein incorporated by reference in its entirety.

FIELD OF INVENTION

The claimed invention relates to delivering private content over a communications network, and more particularly to a system and process for providing multiple levels of authentication before delivering private content to client devices over a communications network.

BACKGROUND OF THE INVENTION

Currently, the most common method used for authenticating a user's identity and verifying whether they have permission to view private content on their client device is by prompting the user to enter a username and password. This username and password combination is then cross-referenced with what's on record in the application's database; the user is granted access if the information entered matches the information stored in the database.

This approach has a number of problems. First, in many instances, the username and password is automatically stored on the user's client device. If the user were to lose his or her client device without signing out of their account, whoever then locates their device would have access to any content viewable through their account. This is a concern even in less sinister circumstances, e.g. where a user has temporarily left his or her device unsupervised and in the presence of others, as the privacy of their digital content can no longer be guaranteed for that period of time.

Similarly, people often use the same password for multiple accounts, e.g. one password for their email account, bank account, social network account, etc. If a user's password were somehow exposed through one of their accounts—either by accident or by criminal means—then the security of all of their accounts would be compromised. Given the recent problems faced by a well-established and well-known global bank and social media company in securing customers' passwords and login information, this concern is certainly a valid one.

A third concern with the common approaches used to authenticate a user's identity is that most services publicly display the URL, or Internet address, of the page that displays the user's private content. As a result, sophisticated Internet users and hackers are sometime able to draw trends in the URL and subsequently decipher what the URL would be for other users of the service. Further, anyone—including the approved user—would be able to copy, paste, and share the address of the page containing the private information. Once the URL is shared once, it can spread virally and without restraint.

Accordingly, the claimed invention proceeds upon the desirability of providing a more secure and reliable way for validating the identity of a user that attempts to access private content delivered via a client device

SUMMARY OF THE INVENTION

Therefore, an object of the claimed invention is to provide multiple levels of authentication in delivering private content via client devices which is more secure and reliable for validating the identity of a user that attempts to access private content delivered via a client device.

Another object of the claimed invention is the concealment of the URL at which the page resides to minimize the potential for accidental exposure of private content delivered via a client device in instances where the user has successfully verified his or her identity.

The term "private content" or "private digital content" as used herein includes any form of content—video, text, images, audio, or any combination thereof—that is associated with a specific user account and is only intended to be accessible by a specific user or group of users, i.e. is not part of the public domain.

In accordance with an exemplary embodiment of the claimed invention, the claimed system and method generates a unique device identifier upon download of processor-executable instructions or an application from the service provider's server, stores the unique device identifier on the server, sends the unique device identifier to the client device over the communications network upon successful validation of username and password, and erases the unique device identifier from the client device memory when the user signs out of the user account on the client device.

In accordance with an exemplary embodiment of the claimed invention, the claimed system method establishes a fixed relationship between a user and a physical product. Preferably, the first person to scan the code on the physical product is designated its owner by default.

In accordance with an exemplary embodiment of the claimed invention, upon each product scan (and API request), the claimed system and method receives the device ID from the client device and compares the received device ID to the stored device ID associated with the product ID on record for the physical object (e.g. bracelet) being scanned. This process is utilized by the claimed system and method to authenticate the identity of a user and to determine whether the requester is a valid user that should be granted access to the private content.

In accordance with an exemplary embodiment of the claimed invention, the claimed system and method delivers private content to a user via their client device over a communications network without disclosing the address or location of the content, such that users cannot access this content without undergoing the claimed authentication process.

In accordance with an exemplary embodiment of the claimed invention, a system for securely delivering private content to client devices over a communications network comprises a plurality of client devices connected to the communications network, a plurality of physical products and a server connected to the communications network. Each client device is associated with a user. Each client device comprises a client processor, a screen, a code reader/decoder and a local memory. Each product is uniquely associated with a client device and a user account. Each product comprises a smart code with product ID encoded therein. The server comprises a server processor and a storage device for storing a plurality of private content for plurality of user accounts. The server receives access requests to access private content from the plurality of client devices over the communications network. Each account is associated with a user and each access request comprises a product ID and the device ID of the client device. The server processor authenticates the received product ID and the received device ID in each access request by determining whether the received product ID is associated with the user account, retrieving the device ID associated with the received product ID from the storage device if the received product ID is determined to be associated with the user account, and comparing the received device ID to the retrieved device ID. The server denies an access request received from a client device to access the requested private content if the server processor is unable to authenticate both the device ID and the product ID in such access request. The server accepts the access request and transmits the requested private content to the client device associated with the device ID in the access request over the communications network if the server processor authenticates that the device ID in the access request is associated with the product ID in the access request, thereby providing multiple levels of authentication before delivering the requested content.

In accordance with an exemplary embodiment of the claimed invention, the aforesaid code reader/decoder of the client device scans the smart code on the physical product associated with the client device and decodes the product ID from the smart code.

In accordance with an exemplary embodiment of the claimed invention, the aforesaid server receives a request to login to the user account from the client device over the communications network and transmits the device ID to the client device associated with the user account over the communications network upon authentication of the login request. The client processor stores the device ID in the local memory.

In accordance with an exemplary embodiment of the claimed invention, the aforesaid server receives a request to logoff the user account from the client device over the communications network. The client processor of the client device erases the device ID from the local memory.

In accordance with an exemplary embodiment of the claimed invention, the aforesaid physical product is at least one of the following: a pendant, a charm, a watch, a bracelet, a ring, a keychain, a poster, a greeting card, a business card, a postcard, a sticker, a party favor, an invitation, an item of clothing, a retail display, a wall signage, a souvenir item, a furniture, a decorative accessory, and a museum or exhibition display.

In accordance with an exemplary embodiment of the claimed invention, the aforesaid server processor generates a unique product ID for each physical product, stores the generated product ID in the smart code associated with each physical product, and associates the product ID received from the client device to the user account of the client device if the product ID is not activated or associated with any user account in the storage device.

In accordance with an exemplary embodiment of the claimed invention, the aforesaid server processor decodes the received product ID from the smart code in each access request received from the client device.

In accordance with an exemplary embodiment of the claimed invention, the aforesaid server processor generates a unique Web address or uniform resource locator (URL) of a webpage for each user account from the product ID associated with each user account. Each webpage hosting the private content of each user account and accessible with the product ID associated with each user account.

In accordance with an exemplary embodiment of the claimed invention, the private content is a webpage. The aforesaid server processor transmits the requested webpage without a uniform resource locator (URL) of the webpage to the client device associated with the device ID in each request over the communications network if the server processor authenticates that the device ID in each request is associated with the product ID in each request, thereby providing multiple levels of authentication in delivering the requested content.

In accordance with an exemplary embodiment of the claimed invention, the aforesaid client processor of the client device displays the webpage received from the server over the communications network on the screen of the client device without the URL of the webpage.

In accordance with an exemplary embodiment of the claimed invention, a system for securely delivering private content to client devices over a communications network comprises a plurality of client devices connected to the communications network and a plurality of physical products. Each client device comprises a client processor, a screen, a code reader/decoder and a local memory. Each client device is associated with a user. Each product is uniquely associated with a client device and a user account. Each product comprises a smart code with product ID encoded therein. The client processor of a client device transmits an access request to a server over the communications network to access private content of the user account associated with a user of the client device. The server maintains a plurality of private content for a plurality of user accounts. The access request comprises the device ID from the local memory of the client device and the product ID scanned from a physical product of the user using by the code reader/decoder of the client device. The client device is denied access to the requested private content by server if the device ID and product ID are not associated with the user account. The client device receives the requested private content from the server over the communications network if both the device ID and the product ID are authenticated as being associated with the user account.

In accordance with an exemplary embodiment of the claimed invention, the aforesaid client processor transmits a request to login to the user account to the server over the communications network, receives the device ID from the server over the communications network upon authentication of the login request, and stores the device ID in the local memory.

In accordance with an exemplary embodiment of the claimed invention, the aforesaid client processor transmits a request to logoff the user account to the server over the communications network and erases the device ID from the local memory.

In accordance with an exemplary embodiment of the claimed invention, each product ID is uniquely associated with each physical product and each product ID is stored in the smart code associated with the physical product. The aforesaid client processor of the client device transmits the product ID to the server over the communications network to associate the product ID to the user account of the user.

In accordance with an exemplary embodiment of the claimed invention, the aforesaid client processor of the client device transmits the access request comprising the smart code scanned from the physical product to the server over the communications network to decode the product ID.

In accordance with an exemplary embodiment of the claimed invention, the private content is a webpage uniquely associated with the user account and for hosting the private content accessible with the product ID associated with the user account. The aforesaid client device receives the requested webpage without a uniform resource locator (URL) of the webpage from the server over the communications network if both the device ID and the product ID are authenticated as being associated with the user account.

In accordance with an exemplary embodiment of the claimed invention, the URL of the requested webpage is generated from the product ID associated with the user account.

In accordance with an exemplary embodiment of the claimed invention, the aforesaid client processor of the client device displays the webpage received from the server over the communications network on the screen of the client device without the URL of the webpage.

Various other objects, advantages, and features of the claimed invention will become readily apparent from the ensuing detailed description, and the novel features will be particularly pointed out in the appended claims

BRIEF DESCRIPTION OF THE DRAWINGS

The following detailed description, given by way of example, and not intended to limit the claimed invention solely thereto, will best be understood in conjunction with the accompanying drawings in which:

DETAILED DESCRIPTION OF THE EMBODIMENTS

Figure 1:
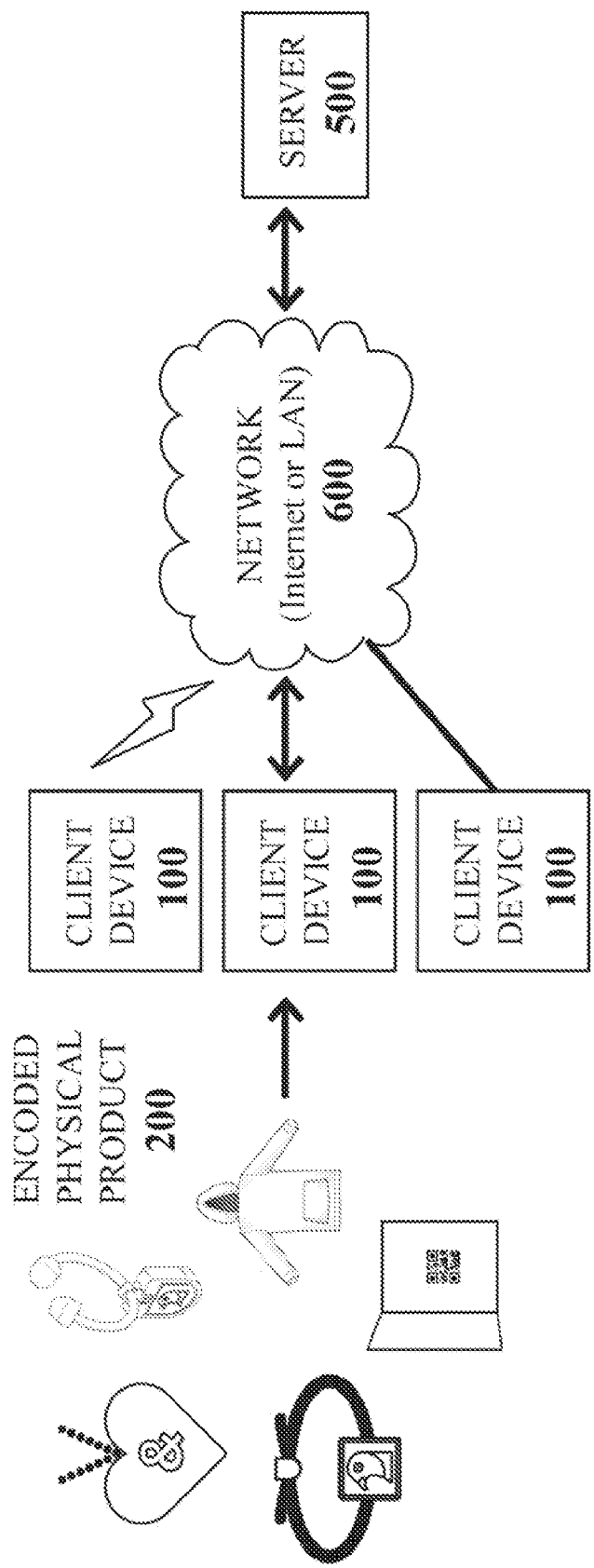
FIG. 1 is a block diagram of the system in accordance with an exemplary embodiment of the claimed invention.

As shown in FIG. 1, at the system level, the claimed invention comprises one or more web-enabled processor based client devices 100, one or more processor based servers 500, and a communications network 600 (e.g., Internet). In accordance with an exemplary embodiment of the claimed invention, as shown in FIG. 2A, each client device 100 comprises a processor or client processor 110, a code reader/decoder 120, a display or screen 130, preferably touch screen 130, a memory 140, a storage device 150 (preferably, a persistent storage, e.g., hard drive), a network connection facility 160 to connect to the communications network 600, which can be wired and/or wireless connection, and user input facility 170 to receive input from the user.

Figure 2B:
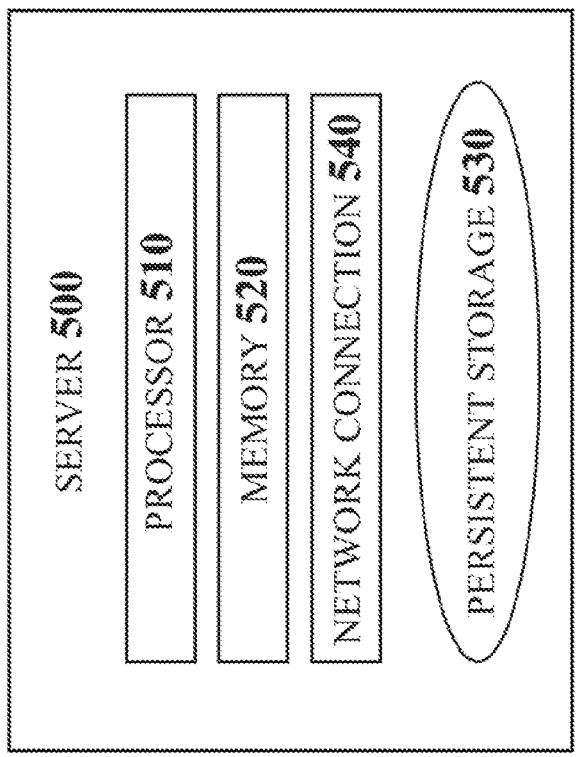
FIGS. 2A-2B are block diagrams of the server and client device in accordance with an exemplary embodiment of the claimed invention.
Figure 2A:
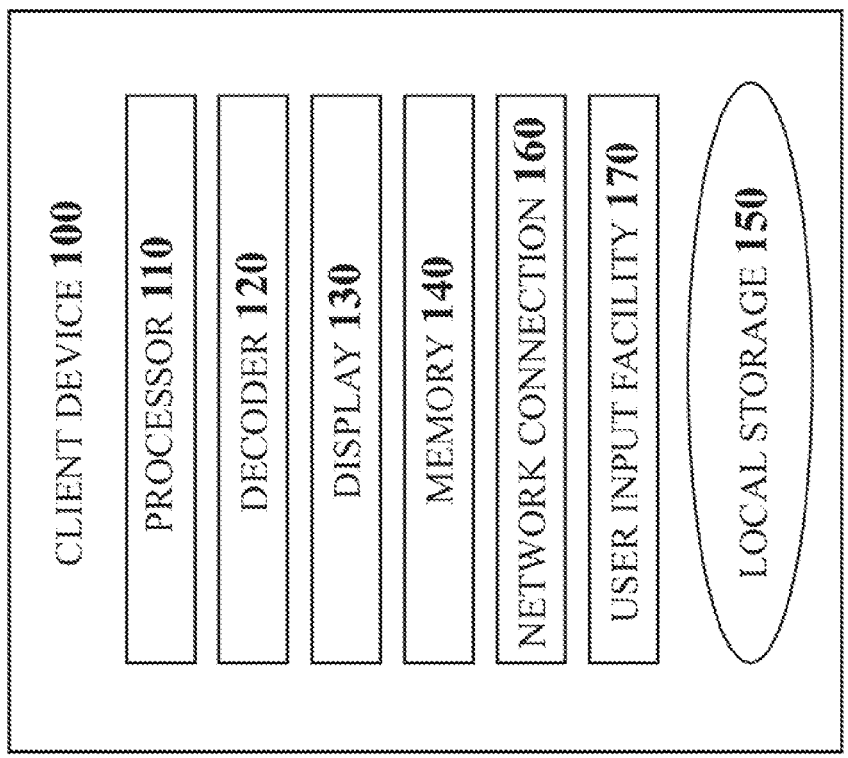

In accordance with an exemplary embodiment of the claimed invention, as shown in FIG. 2B, the server 500 comprises a processor or server processor 510, a memory 520, a storage device 530 (preferably a persistent storage, e.g., hard disk, database, etc.), and a network connection facility 540 to connect to the communications network 600.

The network enabled client device 100 includes but is not limited to a computer system, a personal computer, a laptop, a notebook, a netbook, a tablet or tablet like device, an IPad® (IPAD is a registered trademark of Apple Inc.) or IPad like device, a cell phone, a smart phone, a smart watch, a personal digital assistant (PDA), a mobile device, or a television, or any such device having a screen connected to the communications network 600 and the like.

The communications network 600 can be any type of electronic transmission medium, for example, including but not limited to the following networks: a telecommunications network, a wireless network, a virtual private network, a public internet, a private internet, a secure internet, a private network, a public network, a value-added network, an intranet, a wireless gateway, or the like. In addition, the connectivity to the communications network 300 may be via, for example, by cellular transmission, Ethernet, Token Ring, Fiber Distributed Datalink Interface, Asynchronous Transfer Mode, Wireless Application Protocol, or any other form of network connectivity.

Moreover, in accordance with an embodiment of the claimed invention, the computer-based methods for implementing the claimed invention are implemented using processor-executable instructions for directing operation of a device or devices under processor control, the processor-executable instructions can be stored on a tangible computer-readable medium, such as but not limited to a disk, CD, DVD, flash memory, portable storage or the like. The processor-executable instructions can be accessed from a service provider's website or stored as a set of downloadable processor-executable instructions, for example by downloading and installing from an Internet location, e.g. the server 500 or another web server (not shown).

The claimed system and method provides a more reliable way to verify a user's identity before providing the user access to private content 400 via their client device 100. In accordance with an exemplary embodiment of the claimed invention, the multiple levels of authentication comprises at least two layers: (1) a physical object or product 200—which can take the form of jewelry, clothing, greeting cards, invitations, or other personal products—containing a unique smart code 300—which can take the form of a QR code, near-field communications (NFC) tag, visual recognition, augmented reality technology or the like—that stores a unique identifier, the Product Identification or product ID 201, which is associated with a specific user's account on the server 500; and (2) the user's client device 100, which is assigned a unique identifier, a Device Identification or device ID 101 stored in the storage device 150, of the client device 100 and on the storage device 530 of the server 500, that is permanently associated with the user's account and is paired with the product ID 201 linked to the code 300 on the user's physical product 200.

To gain access to the private content 400 associated with a user's account on the server 500 over the communications network 600 via the client device 100, the user scans the smart code 300 on her physical product 200 using the code reader 120 of the client device 100 associated with her account. The processor 110 of the client device 100 determines the unique product ID 201 associated with the user's physical product 200 from the scanned smart code 300. In accordance with an exemplary embodiment of the claimed invention, upon scanning and processing of the smart code 300, the client processor 110 transmits the product ID 201 and the device ID 101 to the server 500 for processing and authentication over the communications network 600 via the network connection facility 160 of the client device 100. The processor 510 of the server 500 compares the received product ID 201 associated with the user's smart code 300 and the received device ID 101 associated with the client device 100 used to perform the scan with the information stored in the server's 500 storage device or database 530. The user will only be granted access to the content 400 if she is using a client device 100 with the correct device ID 101 to scan the specific code 300 associated with her account and her product 200.

The claimed invention ensures that the security of a user's private content 400 continues to be preserved even if the user loses her client device 100. Specifically, in order for the security of a user's private content 400 to be compromised under the claimed invention, the infiltrator must possess both the user's physical product 200 and user's client device 100 associated with the user's account to successfully infiltrate the user's account with the service provider.

Even in such instances, however, the user has the opportunity to prevent access to her private content 400 by removing the product ID 201 from an approved user's account. This can be accomplished by including a mechanism for resetting access to a specific product 200 in the processor-executable instructions used to implement the claimed invention. When a user executes this mechanism, a request is sent from the client device 100 via the communications network 600 to the server 500 to remove the product ID 201 in question from its storage or database 530. The physical product 200 associated with this product ID 201 can subsequently no longer be used to gain access to private content 400, as it is no longer paired with a device ID 101 on the server 500.

The claimed invention also advantageously eliminates the adverse impact associated with the exposure of a user's password because authentication is no longer solely contingent on information manually entered by the user, such as a username and password.

Further, the claimed invention addresses the problem of unregulated sharing of the URL (uniform resource locator) of the webpage that hosts the private content 400, as the user's content 400 can only be viewed from the authorized and verified/authenticated client device 100. In imposing such condition, the claimed invention is able to advantageously hide the URL of the page that hosts the user's private content 400 from view, such that even the authenticated user will never know the URL and therefore cannot copy, paste, or otherwise share it with anyone else.

In accordance with an exemplary embodiment of the claimed invention, the server 500 identifies the customer, client or user using both a physical product 200 and a client device 100 and generates a pair of unique identifiers (product ID 201 and device ID 101). The server 500 utilizes the pair of unique identifiers 201, 101 associated with the user to authenticate the user's identity thereafter.

Figure 3:
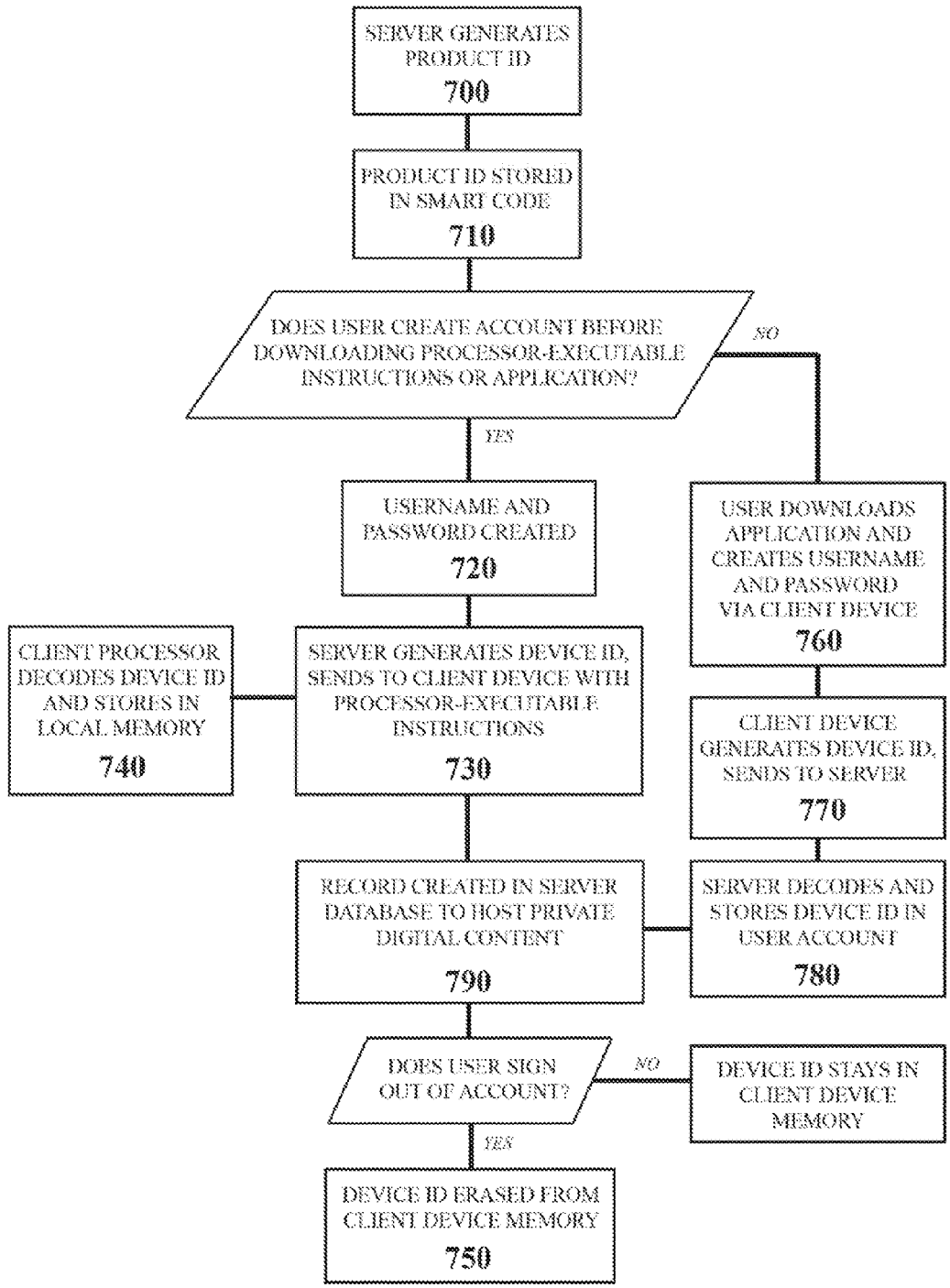
FIG. 3 is a flow chart describing the process of activating a physical product in accordance with an exemplary embodiment of the claimed invention.

In accordance with an exemplary embodiment of the claimed invention, the process of activating a product 200 and registering a user with the server 500 is now described in conjunction with FIG. 3. The server processor 510 generates a smart code 300, e.g., Quick Response (QR) Code, containing a unique predetermined number/character alphanumeric string, such as a unique 5-character alphanumeric string, e.g. a1234 (referred to herein as the product ID 201 at step 700. The generated smart code 300 is attached to or incorporated into a physical product 200, e.g. a watch, jewelry such as a pendant, a charm, a bracelet, or a ring, a keychain, a poster, a greeting card, a business card, a postcard, a sticker, a party favor, an invitation, an item of clothing, a retail display, a wall signage, a souvenir item, a furniture, a decorative accessory, a museum or exhibition display and the like. The server processor 510 stores the generated smart code 300 in the storage device 530 and associates the product ID 201 with the smart code 300 at step 710.

In accordance with an exemplary embodiment of the claimed invention, the user activates the purchased product 200 containing the unique product ID 201 by sending information to the server 500, e.g. via the provider's website, using the client device 100 over the communications network 600 and creates a username and password combination at step 720. The server processor 510 generates and stores the unique device ID 101 in the storage device 530 and transmits the device ID 101 and processor-executable instructions, which could be in the form of a downloadable application, to the client device 100 over the communications network 600 via the network connection facility 540 of the server 500 at step 730.

The processor-executable instructions or application is used by the client device 100 to provide various user interfaces for communicating with the server 500 and displaying private content 400 to the user. The client processor 110 stores the device ID 101, preferably a token containing the device ID 101, received from the server 500 in the local memory 140 at step 740. The device ID 101 is not displayed or disclosed to anyone and the server processor 510 pairs the device ID 101 with the user account maintained by the server 500. That is, the server 500 designates/registers the user as owner of the physical product 200, e.g., bracelet 200, and a record created on the server database 530 at step 790 to host user's private content 400. The client processor 110 erases the device ID 101 from the local memory 140 anytime the user signs out of her account at step 750.

Alternatively, in accordance with an exemplary embodiment of the claimed invention, the user activates the purchased product 200 containing the unique product ID 201 by downloading the processor-executable instructions or application from the server 500, e.g. via the provider's website, using the client device 100 over the communications network 600. The client processor 110 executes the application to access various user interfaces for activating the purchase product 200, communicating with the server 500 and displaying private content 400 to the user at step 760. The user creates a username and password combination using the application at step 760. This information is sent to the server 500 via the communications network 600 and is used to create a new user account in the server's database or storage 530. The client processor 110 generates a unique device ID 101, stores it in its local memory 140, and transmits the device ID 101 to the server 500 over the communications network 600 via the network connection facility 170 of the client device 100 at step 770. The sever processor 510 decodes and stores the device ID 101 received from the client device 100 in its storage 530 at step 780. The device ID 101 is not displayed or disclosed to anyone and the server processor 510 pairs the device ID 101 with the user account maintained by the server 500. That is, the server 500 designates the user as owner of the physical product 200, e.g., bracelet 200, and a record in the server database 530, which can take the form of a webpage, that hosts user's private content 400. The client processor 110 erases the device ID 101 from the local memory 140 anytime the user signs out of her account at step 750. The server processor 510 transmits a token containing the device ID 101 to the user's client device 100 each time the user signs into her account.

In accordance with an exemplary embodiment of the claimed invention, activation of a product 200 occurs when the server 500 creates a new record to host private content 400 in its storage device 530 at step 790. The server processor 510 uses the product ID 201 to create a unique identifier for locating the record in the server database 530 that hosts the private content 400. The choice of method for locating the private content 400 in the server storage device 530 should enable the client device 100 to use the product ID 201 to identify the address of the private content 400 that is linked to the user's purchased product 200. For example, the identifier used to locate the private content 400 can take the form of a unique Internet address or URL, such as http://www.chippd- .com/x/a1234, which identifies an address of a unique Internet webpage that is linked to the purchased product 200.

In accordance with an exemplary embodiment of the claimed invention, a user receives or purchases the physical product 200 and registers and activates the purchased product 200, e.g., bracelet, on the service provider's server 500, preferably via its website, using the user's client device 100 or downloads processor-executable instructions or an application from the service provider via its server 500 or another third-party server onto the user's client device 100.

For ownership of a product 200 to be established, the product's product ID 201 must be paired with the user's device ID 101 and collectively stored in the user's account in the server database 530. In an exemplary embodiment of the claimed invention, the device ID 101 associated with the first client device 100 used to scan the code 300 in a product 200 is paired with that product's product ID 201 on the server 500 and stored in the same record in its database 530. Alternatively, ownership can be established by providing the purchaser with the facility to manually assign product ownership, using a unique identifier, such as a username or email address.

Upon completion of the registration or activation process and establishment of product ownership, the server 500 designates the user as the owner of the activated physical product 200 and the owner of the record in the server database 530 that hosts the user's private content 400. The server processor 510 stores and associates the product ID 201 of the user's product 200 and the device ID 101 of the user's client device 100 with the user account in the storage device 530.

In accordance with an exemplary embodiment of the claimed invention, the purchaser of the product 200 (or recipient of the product 200, e.g., the product 200 was given to the user as a gift) can use the client device 100 to access her account on the server 500 to assign the product ID 201 of the purchased product 200 to her user account, to another user's account, or to one of her many user accounts, temporarily pause access to the record that hosts the private content 400 associated with a specific product ID 201, and/or reset the ownership of a product 200 in the event the wrong user is the first to scan a physical product 200. It is appreciated that the user may not be necessarily limited to one user account.

Once product ownership has been established and the pairing process is complete, the server processor 510 associates and stores the device ID 101 and the product IDs 201 of the products 200 owned by the user with the user account and in the storage device 530, respectively.

In an exemplary embodiment of the claimed invention, one piece of private content 400 can be connected to multiple physical products 200 and smart codes 300. That is, multiple product IDs 201 can be paired with the same private content 400 on the storage device 530. For example, the server processor 510 can associate the product ID 201 of a newly purchased product 200 with an existing record on the storage device 530 that hosts private content 400.

Referring to FIG. 3, during the product activation process, the user can use the device's input facility 170 to specify whether the smart code 300 in the product 200 is associated with an existing record in the storage device or server database 530 or a new record. If the user selects the existing record, then the server processor 510 requests the user to select a specific record from the multiple records in her user account. The server processor 510 adds the product ID 201 of the newly purchased product 200 to the selected record in the server database 530.

Figure 4:
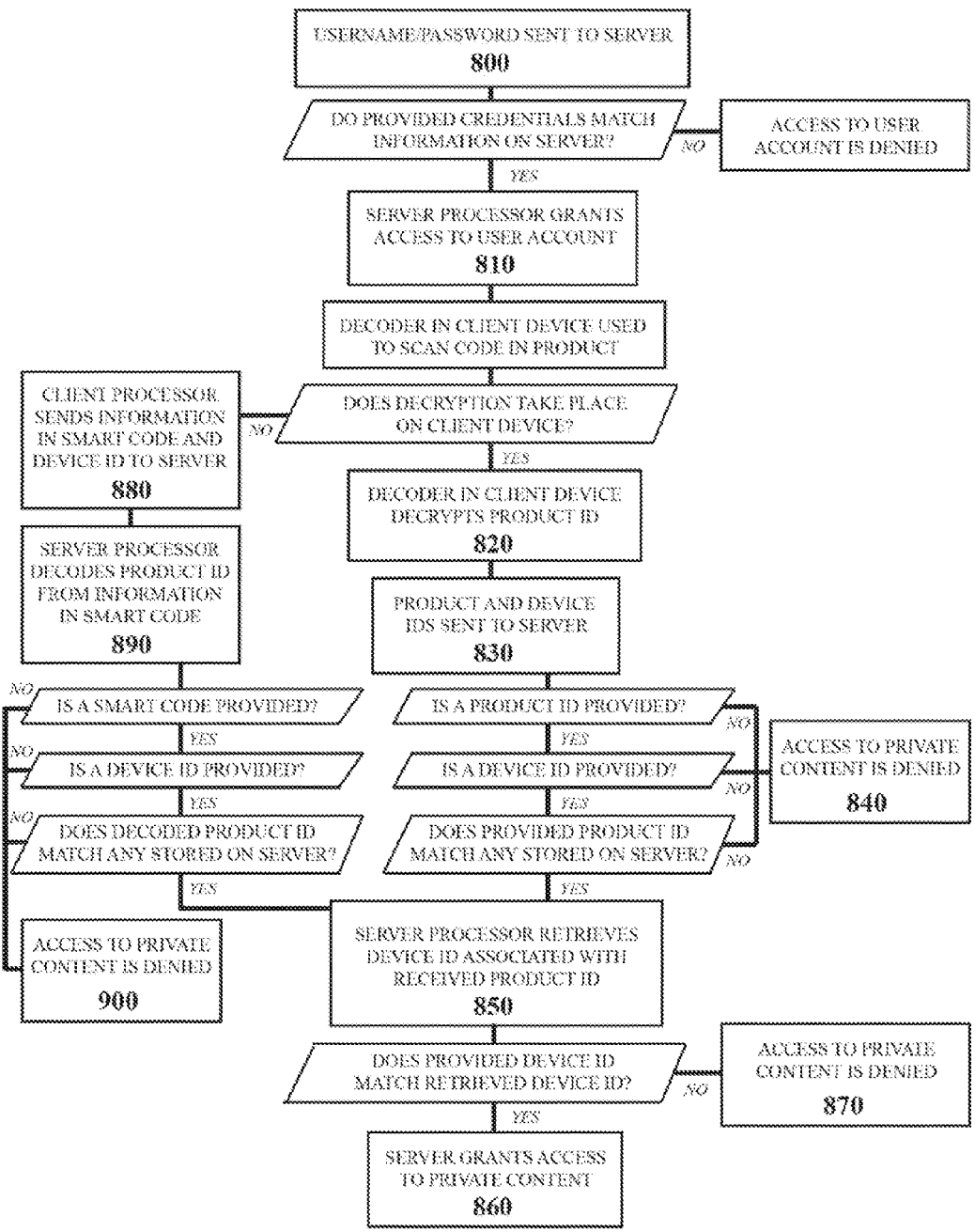
FIG. 4 is a flow chart describing the process of securely transmitting private content to a client device in accordance with an exemplary embodiment of the claimed invention.

In accordance with an exemplary embodiment of the claimed invention, the process of authenticating a user by the server 500 for accessing the private content 400 is now described in conjunction with FIG. 4. To access the private content 400, if not already logged in, the user logins to her account on the server 500 by entering her username and password on the user input facility 170 of the client device 100 or the touch screen display 130 of the client device at step 800. The network connection facility 160 of the client device 100 transmits the entered username and password to the server 500 over the communications network 600. The server processor 510 provides access to the user account upon verification of the username and password received from the client device 100 at step 810. Also, the server processor 510 transmits a token containing the device ID 101 to the user's client device 100 over the communications network 600 via the network connection facility 540 at step 810. The client processor 110 decodes and stores the received device ID 101 in the device local memory 140.

Once the user is logged in to her user account, in accordance with an exemplary embodiment of the claimed invention, to access the user's private content 400 on the server 500, the user scans the product 200, more specifically, the smart code 300 on the product 200, using the client device 100 at step 820. The code reader/decoder 120 of the user's client device 100 scans the smart code 300 associated with the user's product 200 and decodes the product ID 201 from the scanned smart code 300 at step 820. The client processor 110 transmits the decoded product ID 201 received from the code reader/decoder 120 and the device ID 101 stored in the local memory 140 to the server 500 over the communications network 600 via the network connection facility 160 to access the user's private content 400 at step 830. In accordance an exemplary embodiment of the claimed invention, each time the client device 100 scans the smart code 300 on the product 200, the client device 100 generates an API (application program interface) request that requires authentication by the server processor 510.

The server processor 510 denies the client device 100 access to the private content 400 if no product ID 201 is received from the client device 100, if no device ID 101 is received from the client device 100 or if the received product ID 201 does not match any product ID 201 stored in the storage device 530 at step 840. If the received product ID 201 matches one of the stored product IDs 201 in the storage device 530, then the server processor 510 retrieves the device ID 101 associated with the received product ID 201 from the storage device 530 at step 850. If the server processor 510 determines that the received device ID 101 matches the retrieved device ID 101, then the server processor grants the client device 100 access to the private content 400 stored in the record in the server database 530 associated with the user account at step 860. However if the server processor 510 determines that the received device ID 101 does not match the retrieved device ID 101, then the server processor 510 denies the client device 100 access to the private content 400 at step 870. A user scans the smart code 300 on the product 200 at step 820 every time she wants to gain access to the private content 400. That is, a user can access the private content 400 only if the user is using the correct mobile device 100 to scan the correct product 200, e.g., registered pair of client device 100 and product 200 or registered pair of device ID 101 and product ID 201.

Alternatively, the client processor 110 transmits the scanned smart code 300 received from the code reader/decoder 120 and the device ID 101 stored in the local memory 140 to the server 500 over the communications network 600 via the network connection facility 160 to access the user's private content 400 at step 880. The server processor 510 decodes the product ID 201 from the received smart code 300 at step 890. The server processor 510 denies the client device 100 access to the private content 400 if no smart code 300 is received from the client device 100, if no device ID 101 is received from the client device 100 or if the decoded product ID 201 does not match any product ID 201 stored in the storage device 530 at step 900. If the decoded product ID 201 matches one of the stored product IDs 201 in the storage device 530, then the server processor 510 retrieves the device ID 101 associated with the received product ID 201 from the storage device 530 at step 910. If the server processor 510 determines that the received device ID 101 matches the retrieved device ID 101, then the server processor 510 grants the client device 100 access to the private content 400 on the webpage associated with the user account at step 860. However if the server processor 510 determines that the received device ID 101 does not match the retrieved device ID 101, then the server processor 510 denies the client device 100 access to the private content 400 on the webpage associated with the user account at step 870.

Once a user's identity and authorization to view the private web page content 400 has been successfully authenticated, the server 500 transmits the private web page content 400 to the client device 100 used to scan the smart code 300 over the communications network 600 via the network connection facility 540. The client processor 110 executing the processor-executable instructions or application displays the private web page content 400 on the display 130 of the client device 100. In accordance with an exemplary embodiment of the claimed invention, the built-in page display utility of the processor-executable instructions or application hides the page address (also known as its URL) of the private web page content 400. This prevents other users from accessing the private content 400 without undergoing the authentication process of the claimed invention and helps preserve the privacy and security of the private content 400 delivered to the provider's users. Preferably, the server processor 510 encrypts the private content 400 before transmitting it to the client device 100 over the communications network 600. The client processor 110 decrypts the encrypted private content 400 and displays the decrypted private content 400 on the display 130.

Before any private content 400 can be transmitted to another person or user, the client device 100 adds the private content 400 to a record of a user account maintained in the server database 530. For example, the client device 100 receives the private content 400 from the user via the input facility 170 and the client processor 110 transmits the received private content 400 to the server 500 over the communications network 600. The client device 100 can upload the private content 400 from the local storage 150 and the client processor 510 transmits the uploaded private content 400 to the server 500 over the communications network 600

Figure 5:
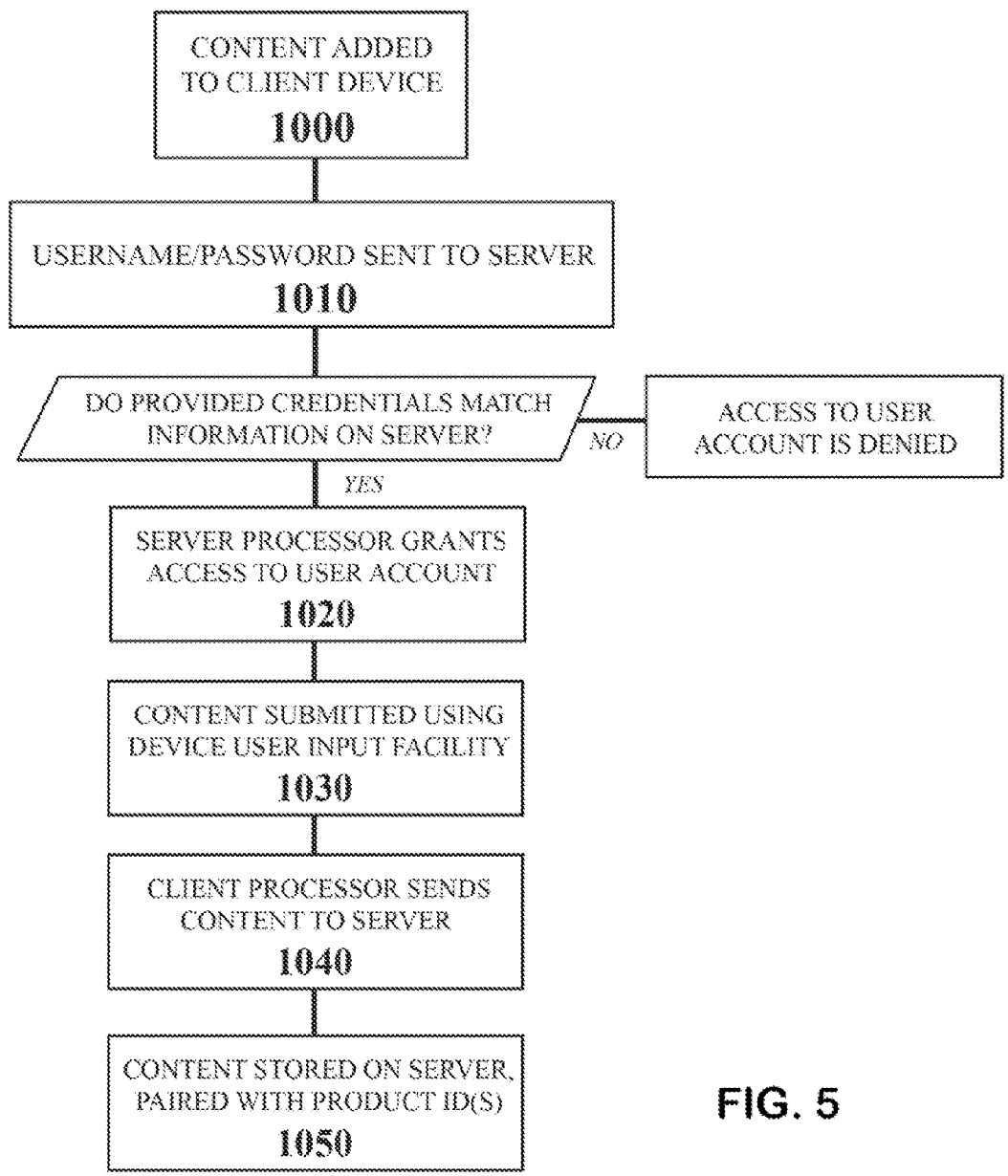
FIG. 5 is a flow chart describing the process of transmitting private content to the server for secure delivery to one or more client devices in accordance with an exemplary embodiment of the claimed invention.

In accordance with an exemplary embodiment of the claimed invention, the process of transmitting the private content 400 by the user's client device 100 to the client device 100 of a recipient or the client devices 100 of a group of recipients now described in conjunction with FIG. 5. The user adds the private content 400 to her client device 100 using the input facility 170 and preferably, the client processor 110 stores the private content 400 in the local storage 150 at step 1000. It is appreciated that the private content 400 can be added to the client device 100 using any known content capturing devices, e.g. a camera, audio or video recorder and the like, by a portable storage media, e.g., flash drive, or by downloading the private content 400 from the Internet or a web server over the communications network 600.

If the client device 100 is not already logged into the user account, the client processor 110 logs into the user account by transmitting to the server 500 the username and password received from the user via the input facility 170 of the client device 100 or the touch screen display 130 of the client device 100 at step 1010. The network connection facility 160 of the client device 100 transmits the entered username and password to the server 500 over the communications network 600. The server processor 510 provides access to the user account upon verification of the username and password received from the client device 100 at step 1020.

Once logged in, the user selects the private content 400 from the local storage 150 using the input facility 170 of the client device 100 to be submitted to the server 500 at step 1030. The client processor 110 transmits the selected private content 400 to the server 500 over the communications network 600 using the network connection facility 160 at step 1040.

The server processor 510 receives the private content 400, preferably private digital content, from the client device 100, associates the received private content 400 with the user account and stores the received private content 400 on the server database 53 at step 1050. The server processor 510 pairs the received private content 400 with at least one product ID 201. It is appreciated that the user can add, remove, or edit private content 400 at anytime by logging into her account.

After the client device 100 transmits or uploads the private content 400 to the server 500 over the communications network 400, the user can authorize the server 500 to deliver the private content 400 to one or more authorized recipients. In accordance with an exemplary embodiment of the claimed invention, the user can permit access to the private content 400 by providing each authorized recipient with a physical product 200. The server processor 510 pairs the product ID 201 of each physical product 200 with the same private content 400 in the server database 530.

In accordance with an exemplary embodiment of the claimed invention, the server processor 510 pairs the device ID 101 of the client device 100 of the first user to scan each product 200 with the product ID 201 in the same record as the private content 400 on the server database 530. In the event that the wrong user is the first to scan the product 200, the stored pair of device ID 101 and product ID 201 in the server database 530 can be replaced with the correct pairing.

The user can also grant access to her private content 400 to one or specific recipients by providing a unique identifier, e.g. an email address, which is used to identify the authorized recipient's device ID 101 in the server database 530. The server processor 510 then pairs the authorized recipient's device ID 101 with the product ID 201 associated with the product 200 in question.

In accordance with an exemplary embodiment of the claimed invention, the user can use the claimed system via her client device 100 to notify the authorized recipients of any updates to the private content 400. The client processor 110 of the client device 100 associated with the user sends an update notification to the server 500 over the communications network via the network connection facility 160. The server processor 510 receives the update notification comprising the address of the record that hosts the private content 400 on the server storage device 530 from the client device 100. The server processor 510 retrieves all the product IDs 201 associated or stored in this record, identifies all the paired device IDs 101, and sends an alert to the client devices 100 corresponding to the device IDs 101 over the communications network 600 using the network connection facility 540. Alternatively, when the client device 100 changes or updates the private content 400 on the webpage associated with the user account, i.e., the user's record, the server processor 510 retrieves all the product IDs 201 associated or stored in this record, identifies all the paired device IDs 101, and sends an alert to the client devices 100 corresponding to the device IDs 101 over the communications network 600 using the network connection facility 540.

In accordance with an exemplary embodiment of the claimed invention, the delivery of private content 400 to a recipient from a user by the claimed system is now described using exemplary scenarios. In the first exemplary scenario, a husband buys a greeting card 200 with a unique QR code 300 (or a unique smart code 300) as a gift for his wife. The QR code 300 contains a unique alphanumeric string 201 or the product ID 201. The server processor 510 creates a new record in the server database 530 that contains the product ID 201 of the greeting card 200 and a webpage on the server 500 to host the private content 400. The client device 100, preferably a recorder of the client device 100, records husband's personal video message 400 (i.e., the private content 400) for his wife and uploads the video message 400 to server 500 over the communications network 600 via the network connection facility 160. The server processor 510 associates and stores the video message 400 with the record created for the product ID 201 of the greeting card 200 in the server database 530.

The husband gives his wife the greeting card 200 and tells her that it contains a special message (i.e., a private content 400) exclusively for her. To access the private content 400, his wife uses her client device 100 to download the application from the service provider's website (or the server 500) and creates a username and password combination for her user account. The client processor 110 of her client device 100 transmits these credentials (i.e., the username and password combination) to the server 500 over the communication network 600 using the network connection facility 160 of her client device 100. The server processor 510 generates a unique device ID 101 and transmits the device ID 101 to her client device 100 over the communications network 600. The client processor 110 of her client device 100 stores the device ID 101 in the local memory 140 of her client device 100.

The wife uses the code reader/decoder 120 of her client device 100 to scan the smart code 300 on the greeting card 200 that she received from her husband. Preferably, the code reader/decoder 120 decodes the product ID 210 from the scanned smart code 300. The client processor 110 transmits the device ID 101 and the product ID 201 to the server 500 over the communications network 600. The server processor 510 pairs the device ID 101 of the wife's client device 100 and the video 400 uploaded by the husband in the server storage device 530. Since the server 500 received the scanned smart code 300 on the greeting card 200 first from the wife's client device 100, the server processor 510 associates from the greeting card 200 with her account and her client device 100, and grants her client device 100 access to the video message 400.

In the second exemplary scenario, an engaged couple purchases a set of invitation cards 200 to send to their family and friends in advance of their wedding. Each invitation card 200 has a smart code 300 containing a unique product ID 201. Upon completing the purchase, the server processor 510 creates a new record in the server database 530 that contains an address or URL of the webpage on the server 500 to host the couple's private content 400. The server processor 510 adds each invitation card's product ID 201 to this record and pairs any private content 400 added by the couple to this record.

For example, the couple adds/uploads private content 400, e.g., photos and a video, to their client device 100 or uses the camera in their client device 100 to take the photos and videos 400. If the couple does not already have a user account, the couple uses their client device 100 to download the application (or processor-executable instructions) from the service provider's website (or the server 500) and creates a username and password combination for their user account. The client processor 110 of their client device 100 transmits these credentials (i.e., the username and password combination) to the server 500 over the communication network 600 using the network connection facility 160 of their client device 100. The server processor 510 generates a unique device ID 101 and transmits the device ID 101 to their client device 100 over the communications network 600. The client processor 110 of their client device 100 stores the device ID 101 in the local memory 140 of their client device 100.

The couple uses their client device 100 to submit a variety of private content 400 via the input facility 170, including, but not limited to, the story of how they met, a detailed itinerary for the wedding, some photographs, and a short video celebrating their relationship. The client processor 110 of their client device 110 transmits the private content 400 to the server 500 over the communications network 600 using the network connection facility 160. The server processor 510 compiles and stores the received private content 400 to the record created during the product activation in the server database 530. The private content 400 is now ready for retrieval by authorized recipients.

The couple sends out the invitation cards 200 to their family members and friends. To access the private content 400, each invitee (i.e., each authorized recipient) uses her client device 100 to download the application from the service provider's website (or the server 500) and creates a username and password combination for her user account. The client processor 110 of her client device 100 transmits these credentials (i.e., the username and password combination) to the server 500 over the communication network 600 using the network connection facility 160 of her client device 100. The server processor 510 generates a unique device ID 101 and transmits the device ID 101 to her client device 100 over the communications network 600. The client processor 110 of her client device 100 stores the device ID 101 in the local memory 140 of her client device 100.

Each invitee uses the code reader/decoder 120 of her client device 100 to scan the smart code 300 on the invitation card 200 that she received from the couple. Preferably, the code reader/decoder 120 decodes the product ID 210 from the scanned smart code 300. The client processor 110 transmits the device ID 101 and the product ID 201 to the server 500 over the communications network 600. The server processor 510 pairs the device ID 101 of the invitee's client device 100 and the private content 400 uploaded or added by the couple in the server storage device 530. Since the server 500 received the scanned smart code 300 on this particular invitation card 200 first from this invitee's client device 100, the server processor 510 associates from this particular invitation card 200 with her account and her client device 100, and grants her client device 100 access to the private content 400. The server 500 transmits the private content 400 to this invitee's client device 100 and the client processor 110 displays the private content on the display 130. That is, the server 500 would reject an access request to this private content 400 from a different client device 100 even if the server 500 receives the scanned smart code 300 from this particular invitation card 200 because the smart code 300 (or the product ID 210) from this particular invitation card 200 is already associated with another client device 100.

In the third exemplary scenario, a multi-national manufacturer of heavy machinery and equipment is looking for a way to securely transmit confidential information 400 (i.e., the private content 400) to its salespeople overseas. This confidential information 400 can include anything from time-sensitive updates to a request-for-proposal to strategic briefs on a target customer. The company purchases or obtains a physical product 200, e.g., a bracelet 200, for each of its key salespeople. Each bracelet 200 has a smart code 300 containing a unique product ID 201. Upon completing the purchase of the bracelets 200, the server processor 510 creates a new record in the server database 530 that contains an address or URL of the webpage on the server 500 to host the couple's private content 400 for each bracelet 200. The server processor 510 adds each bracelet's product ID 201 to this record and pairs any private content 400 added by the company to this record.

The company can add/upload private content 400 to their client device 100. If the company does not already have a user account, the company uses their client device 100 to download the application (or processor-executable instructions) from the service provider's website (or the server 500) and creates a username and password combination for their user account. The client processor 110 of their client device 100 transmits these credentials (i.e., the username and password combination) to the server 500 over the communication network 600 using the network connection facility 160 of their client device 100. The server processor 510 generates a unique device ID 101 and transmits the device ID 101 to their client device 100 over the communications network 600. The client processor 110 of their client device 100 stores the device ID 101 in the local memory 140 of their client device 100.

It is appreciated that the company can transmit same or different private content 400 to each salesperson using the claimed system. For example, the company can add or upload confidential information, i.e., the private content 400, about competitor bids to one of its salesperson (identified herein as salesperson A) in advance of an upcoming pitch for a new contract. Using any known means to securely upload the private content 400 to the company's client device 100, the client processor 110 transmits the private content 400 to the server 500 over the communications network 600 using the network connection facility 160. The server processor 510 compiles and stores the received private content 400 to the record in the server database 530 that corresponds to the product ID 201 of the salesperson A's bracelet 200. Preferably, as additional level of security, the company adds an identifier for the salesperson A, such as her work email address, to ensure that she is the only individual that can activate her bracelet 200.

To access the private content 400, the salesperson A uses her client device 100 to download the application from the service provider's website (or the server 500) and creates a username and password combination for her user account. The client processor 110 of her client device 100 transmits these credentials (i.e., the username and password combination) to the server 500 over the communication network 600 using the network connection facility 160 of her client device 100. The server processor 510 generates and stores a unique device ID 101 in the server database 530, and transmits the device ID 101 to her client device 100 over the communications network 600. The client processor 110 of her client device 100 stores the device ID 101 in the local memory 140 of her client device 100.

Upon receipt of the bracelet 200, the salesperson A uses the code reader/decoder 120 of her client device 100 to scan the smart code 300 on the bracelet 200. Preferably, the code reader/decoder 120 decodes the product ID 210 from the scanned smart code 300. The client processor 110 transmits the device ID 101 and the product ID 201 to the server 500 over the communications network 600 for authentication. Since the server 500 received the scanned smart code 300 on this particular bracelet 200 first from the salesperson A's client device 100, the server processor 510 associates from this particular bracelet 200 with her account and her client device 100. Also, since the email address associated with the salesperson A's device ID 101 matches the email address specified by the company and the product ID 201 matches the ID 201 associated with the company's private content 400, her client device 100 is granted access to the company's confidential information 400. The server processor 510 designates, records and associates the salesperson A's client device 100 with this specific bracelet 200 and its associated product ID 201. The server 500 transmits the private content 400 to the salesperson A's client device 100 and the client processor 110 displays the private content on the display 130.

Unfortunately, the salesperson A misplaces her bracelet 200 before the pitch. A salesman from a competitor finds the lost bracelet 200, installs the necessary processor-executable instructions onto his client device 100, and creates a username and password. The server 500 assigns a unique device ID 101 to the competing salesman's client device 100. He uses the decoder 120 in his client device 110 to scan the smart code 300 on the lost bracelet 200. The client processor 110 of his client device 100 transmits the device ID 101 and the product ID 201 of the lost bracelet 200 to the server 500 over the communications network 600. In such scenario, the server processor 510 determines that the device ID 101 of the competing salesman's client device 100 does not match the device ID 101 stored in the server database 530 for the product ID 201 of this lost bracelet 200. The record in the server database 530 associates the device ID 101 of the salesperson A's client device 100 with the product ID 201 of this lost bracelet 200. The competitor is subsequently denied access to the company's private content 400. That is, the server 500 would reject an access request to the company's private content 400 from a different client device 100 even if the server 500 receives the scanned smart code 300 from this particular bracelet 200 because the smart code 300 (or the product ID 210) from this particular bracelet 200 is already associated with the salesperson A's client device 100.

In accordance with an exemplary embodiment of the claimed invention, the claimed system and method has numerous applications, including but not limited to the following private content 400:

To link to a page containing an individual's medical information and/or history. This would enable the authorized health care providers to access patient information or private content 400, particularly during emergencies, where the patient may be incapacitated or unable to communicate.

To link to a page containing information about an individual's expertise, job history, and other professional details. This would enable the individual to share his or her information with colleagues, prospective employers, and other professionals.

To link to a page containing information about an event, such as a wedding, a gala, a concert, a corporate party, etc. This would enable the event organizer to share pertinent information with attendees in a private and convenient way. In addition, the preferred could also act as an invitation or proof of admission to an event.

To link to a page containing information about a musician, artist, sports team, corporation, brand or any other type of organization. This would enable the page owner to share exclusive information about his or her organization with its fans or followers.

To link to a page containing personal information intended for close friends or family members, as well as to mark special milestones, such as a wedding or the birth of a child. This would enable members of the group to privately share personal information amongst one another.

To link to a page containing personal information intended for a romantic partner, which would enable a couple to share things with one another on a private page.

To link to a page containing personal information, such as a video, created to celebrate a friend, family member, or romantic partner's birthday, an anniversary, an engagement or wedding, the birth of a baby, or any other major life milestone.

To link to a page containing private information about a retail store or brand, as a way to share exclusive digital content with their customers or fans, including rewards, promotions, special events, and other unique content. In addition, the exclusive digital content can also act as a coupon, proof of admission to an event, or a loyalty card.

To link to a page containing private information about museum and art exhibitions, as a way to share stories about the items in an exhibit, gallery, or show; to promote future exhibits, galleries, or shows; and, to share rewards and exclusive content with customers.

To link to a page containing private information about a music concert, musical or play, or other form of performed arts, as a digital alternative to an event program or as a way to share exclusive information with those that attended the event.

To link to a page displaying private user submission forms that allow other individuals to upload content, including text, audio, video, and images, to the page.

Various omissions, modifications, substitutions and changes in the forms and details of the device illustrated and in its operation can be made by those skilled in the art without departing in any way from the spirit of the present invention. Accordingly, the scope of the invention is not limited to the foregoing specification, but instead is given by the appended claims along with their full range of equivalents.

The invention claimed is:

1. A system for securely delivering private content to client devices over a communications network, comprising:
    a plurality of client devices connected to the communications network, each client device comprising a client processor, a screen, a code reader/decoder and a local memory and each client device is associated with a user;
    a plurality of physical products, each product being uniquely associated with a client device and a user account, and each product comprises a smart code with product ID encoded therein;
    a server connected to the communications network, the server comprises a server processor and a storage device to store a plurality of private content for a plurality of user accounts, each user account is associated with a user, and receives access requests to access private content from the plurality of client devices over the communications network, each access request comprises a product ID and a device ID of the client device;
    the server processor is configured to: authenticates the received product ID and the received device ID in an access request by determining whether the received product ID is associated with the user account; generates a unique Web address or uniform resource locator (URL) of a webpage for each user account from the product ID associated with said each user account, each webpage hosting the private content of said each user account and accessible with the product ID associated with said each user account; retrieves the device ID associated with the received product ID from the storage device in response to determining that the received product ID is associated with the user account, and compares the received device ID to the retrieved device ID in response to determining that the received product ID is associated with the user account;
    wherein the server denies the access request received from a client device to access the requested private content in response to non-authentication by the server processor of either the received device ID or the received product ID in the access request; and
    wherein the server accepts the access request and transmits the requested private content to the client device associated with the received device ID in the access request over the communications network in response to authentication by the server processor that the received device ID in the access request is associated with the received product ID in the access request, thereby providing multiple levels of authentication before delivering the requested content.

2. The system of claim 1, wherein the code reader/decoder of the client device scans the smart code on the physical product associated with the client device and decodes the product ID from the smart code.

3. The system of claim 1, wherein server receives a request to login to the user account from the client device over the communications network and transmits the device ID to the client device associated with the user account over the communications network upon authentication of the login request; and wherein the client processor stores the device ID in the local memory.

4. The system of claim 3, wherein the server receives a request to logoff the user account from the client device over the communications network; and wherein the client processor of the client device erases the device ID from the local memory.

5. The system of claim 1, wherein the physical product is at least one of the following: a pendant, a charm, a watch, a bracelet, a ring, a keychain, a poster, a greeting card, a business card, a postcard, a sticker, a party favor, an invitation, an item of clothing, a retail display, a wall signage, a souvenir item, a furniture, a decorative accessory, and a museum or exhibition display.

6. The system of claim 1, wherein the server processor generates a unique product ID for each physical product, stores the generated product ID in the smart code associated with said each physical product, and associates the product ID received from the client device to the user account of the client device in response to determining that the product ID is not activated or associated with any user account in the storage device.

7. The system of claim 1, wherein the server processor decodes the received product ID from the smart code in said each access request received from the client device.

8. The system of claim 1, wherein the private content is a webpage; and wherein the server processor transmits the requested webpage without a uniform resource locator (URL) of the webpage to the client device associated with the received device ID in the request over the communications network in response to authentication by the server processor authenticates that the received device ID in the request is associated with the received product ID in the request, thereby providing multiple levels of authentication before delivering the requested content.

9. The system of claim 8, wherein the client processor of the client device displays the webpage received from the server over the communications network on the screen of the client device without the URL of the webpage.

10. A system for securely delivering private content to client devices over a communications network, comprising:
- a plurality of client devices connected to the communications network, each client device comprising a client processor, a screen, a code reader/decoder and a local memory and each client device associated with a user;
- a plurality of physical products, each product being uniquely associated with a client device and a user account, and each product comprises a smart code with product ID encoded therein;
- wherein the client processor of a client device transmits an access request to a server over the communications network to access a webpage uniquely associated with the user account associated with a user of the client device, the webpage hosting private content accessible with the product ID associated with the user account,
- the server maintains a plurality of private content for a plurality of user accounts, and the access request comprises the device ID from the local memory of the client device and the product ID scanned from a physical product of the user using by the code reader/decoder of the client device;
- wherein the client device is denied access to the requested webpage by server in response to determining that the device ID and product ID are not associated with the user account; and
- wherein the client device receives the requested webpage without a uniform resource locator (URL) of the webpage from the server over the communications network in response to authentication that both the device ID and the product ID are associated with the user account.

11. The system of claim 10, wherein the code reader/decoder of the client device scans the smart code on the physical product associated with the client device and decodes the product ID from the smart code.

12. The system of claim 10, wherein client processor transmits a request to login to the user account to the server over the communications network, receives the device ID from the server over the communications network upon authentication of the login request, and stores the device ID in the local memory.

13. The system of claim 12, wherein the client processor transmits a request to logoff the user account to the server over the communications network and erases the device ID from the local memory.

14. The system of claim 10, wherein the physical product is at least one of the following: a pendant, a charm, a watch, a bracelet, a ring, a keychain, a poster, a greeting card, a business card, a postcard, a sticker, a party favor, an invitation, an item of clothing, a retail display, a wall signage, a souvenir item, a furniture, a decorative accessory, and a museum or exhibition display.

15. The system of claim 10, wherein each product ID is uniquely associated with each physical product and stored in the smart code associated with said each physical product; and wherein the client processor of the client device transmits the product ID to the server over the communications network to associate the product ID to the user account of the user.

16. The system of claim 10, wherein the client processor of the client device transmits the access request comprising the smart code scanned from the physical product to the server over the communications network to decode the product ID.

17. The system of claim 10, wherein the URL of the requested webpage is generated from the product ID associated with the user account.

18. The system of claim 10, wherein the client processor of the client device displays the webpage received from the server over the communications network on the screen of the client device without the URL of the webpage.

* * * * *